United States Patent
Bai et al.

(10) Patent No.: US 10,386,542 B2
(45) Date of Patent: Aug. 20, 2019

(54) PREDICTING ICE COATING STATUS ON TRANSMISSION LINES

(71) Applicant: Utopus Insights, Inc., Valhalla, NY (US)

(72) Inventors: Xinxin Bai, Beijing (CN); Jin Dong, Beijing (CN); Xiao Guang Rui, Beijing (CN); Haifeng Wang, Beijing (CN); Wen Jun Yin, Beijing (CN); Meng Zhang, Beijing (CN)

(73) Assignee: Utopus Insights, Inc., Valhalla, NY (US)

( * ) Notice: Subject to any disclaimer, the term of this patent is extended or adjusted under 35 U.S.C. 154(b) by 1068 days.

(21) Appl. No.: 14/010,839

(22) Filed: Aug. 27, 2013

(65) Prior Publication Data
US 2014/0067271 A1 Mar. 6, 2014

(30) Foreign Application Priority Data
Aug. 30, 2012 (CN) .......................... 2012 1 0316715

(51) Int. Cl.
*G01W 1/10* (2006.01)
*H02G 7/16* (2006.01)

(52) U.S. Cl.
CPC ............... *G01W 1/10* (2013.01); *H02G 7/16* (2013.01); *Y02A 90/14* (2018.01)

(58) Field of Classification Search
CPC .................................. G01W 1/10; H02G 7/16
See application file for complete search history.

(56) References Cited

U.S. PATENT DOCUMENTS

| 6,952,648 B1 * | 10/2005 | Menard ..................... H02J 3/00 700/286 |
| 2009/0033542 A1 * | 2/2009 | Venkatachalam ....... G01S 7/292 342/73 |
| 2010/0131202 A1 | 5/2010 | Dannevik et al. |
| 2011/0253841 A1 * | 10/2011 | Kozlow ................. B64D 15/20 244/134 F |
| 2012/0173146 A1 * | 7/2012 | Mohr ...................... G01W 1/00 702/3 |

(Continued)

FOREIGN PATENT DOCUMENTS

| CN | 201374008 Y | 12/2009 |
| CN | 101672667 A | 3/2010 |

(Continued)

*Primary Examiner* — Stephanie E Bloss
*Assistant Examiner* — Lisa E Peters
(74) *Attorney, Agent, or Firm* — Ahmann Kloke LLP

(57) ABSTRACT

A method and apparatus for predicting ice coating status on transmission lines. In one embodiment of the present invention, there is provided a method for predicting ice coating status on transmission lines, including: collecting real-time meteorological data from at least one meteorological sensor; generating a meteorological element predicted value based on the real-time meteorological data, an initial field and a weather forecasting model; and obtaining a set of lines that meet ice coating conditions among the transmission lines, based on the meteorological element predicted value and attribute information of the transmission lines. In one embodiment of the present invention, there is provided an apparatus for predicting ice coating status on transmission lines.

9 Claims, 9 Drawing Sheets

(56) References Cited

U.S. PATENT DOCUMENTS

2013/0249321 A1* 9/2013 Gao .................. H02G 7/16
307/147

FOREIGN PATENT DOCUMENTS

| | | | |
|---|---|---|---|
| CN | 201417182 Y | | 3/2010 |
| CN | 101793501 B | | 4/2011 |
| CN | 102054328 A | | 5/2011 |
| CN | 102054328 A | | 5/2011 |
| CN | 201903953 U | | 7/2011 |
| CN | 102156793 | * | 8/2011 |
| CN | 102297674 A | | 12/2011 |
| CN | 102508321 A | | 6/2012 |
| JP | 09243757 A | | 9/1997 |

* cited by examiner

PREDICTING ICE COATING STATUS ON TRANSMISSION LINES

CROSS-REFERENCE

This application claims priority under 35 U.S.C. § 119 from Chinese Patent Application No. 201210316715.9 filed on Aug. 30, 2012 the entire contents of which are incorporated herein by reference.

FIELD

Embodiments of the present invention relate to ice coating prediction, and more specifically, to a method and apparatus for predicting ice coating status on transmission lines.

BACKGROUND

With social development, electric power has become an important energy on which people's daily work and life are heavily dependent. Usually electric energy is transmitted to destination cities from a power station through hundreds of kilometers of transmission lines. Transmission lines are widely distributed, usually in field areas with complex geographical conditions, where maintenance personnel are unlikely to examine every day whether the transmission lines are abnormal or not. Additionally, in recent years, severe weather such as snowstorms, sleet and the like caused by extreme climate has posed serious threats to the security of transmission lines.

Under low-temperature conditions such as snowstorms and sleet, ice coating will form at the surface of transmission lines (like power lines, power towers, power poles, etc.), and the thickness of ice coating varies with the lapse of time and the change of meteorological conditions. When the thickness of ice coating reaches a certain degree, supports like power towers and power poles can no longer withstand the weight of ice coating, and then accidents like tilt or even collapse of the power towers and power poles will occur. If such accidents occur in a high-voltage power grid or extra-high voltage power grid, a large-scope blackout can occur and huge economic losses incurred. Moreover, to maintain equipment along transmission lines after the accident will take enormous human and material resources and incur high expenses.

Hence, the security monitoring and hazard early-warning of transmission lines have become a research focus. In this regard, existing technical solutions still focus on monitoring transmission lines by cameras or other devices, and upon detecting any abnormity (for example, the thickness of ice coating reaches a certain extent or power poles tilt, etc.), dispatching maintenance personnel to the site to eliminate the abnormality. Remedies taken by maintenance personnel can prevent further losses but cannot recover those incurred losses.

SUMMARY

Therefore, it is desired to develop a technical solution capable of predicting possible risks in transmission lines and that this technical solution can predict ice coating status on transmission lines with as few changes as possible in existing grid equipment It is further desired that this technical solution can be applied to transmission lines in a whole grid, rather than being limited to transmission lines with monitoring devices deployed thereon. To this end, the embodiments of the present invention provide a method and apparatus for predicting ice coating status on transmission lines, as well as a corresponding computer program product.

In one embodiment of the present invention, there is provided a method for predicting ice coating status on transmission lines, including: collecting real-time meteorological data from at least one meteorological sensor; generating a meteorological element predicted value based on the real-time meteorological data, an initial field and a weather forecasting model; and obtaining a set of lines that meet ice coating conditions among the transmission lines, based on the meteorological element predicted value and attribute information of the transmission lines.

Another embodiment of the present invention further includes: predicting the thickness of ice coating on a line in the set of lines according to an ice coating growth model.

In one embodiment of the present invention, there is provided an apparatus for predicting ice coating status on transmission lines, including: a collecting module configured to collect real-time meteorological data from at least one meteorological sensor; a generating module configured to generate a meteorological element predicted value based on the real-time meteorological data, an initial field and a weather forecasting model; and an obtaining module configured to obtain a set of lines that meet ice coating conditions among the transmission lines, based on the meteorological element predicted value and attribute information of the transmission lines.

Another embodiment of the present invention further includes: a predicting module configured to predict the thickness of ice coating on a line in the set of lines according to an ice coating growth model.

By means of the method and apparatus of the present invention, sensors may be arranged only at typical locations representative of one type of meteorological conditions (for example, only ten-odd sensors are arranged in all of Beijing), thereby greatly reducing the number of sensors arranged along transmission lines. Moreover, ice coating status on transmission lines in a grid may be provided based on high-precision meteorological element predicted values (for example, a set of transmission lines on which ice coating might be formed in the future may be provided), and early warning is provided to possible accidents so that grid maintenance personnel remove hidden dangers of accidents in advance. In addition, the thickness of ice coating on a line in the set of lines may be predicted, so that maintenance personnel of the power grid may take corresponding measures according to how serious the conditions of ice coating are in the future.

BRIEF DESCRIPTION OF THE SEVERAL VIEWS OF THE DRAWINGS

Through the more detailed description in the accompanying drawings, the above and other objects, features and advantages of the embodiments of the present invention will become more apparent. Several embodiments of the present invention are illustrated in a schematic instead of a limited manner. In the drawings.

DETAILED DESCRIPTION

Figure 1:
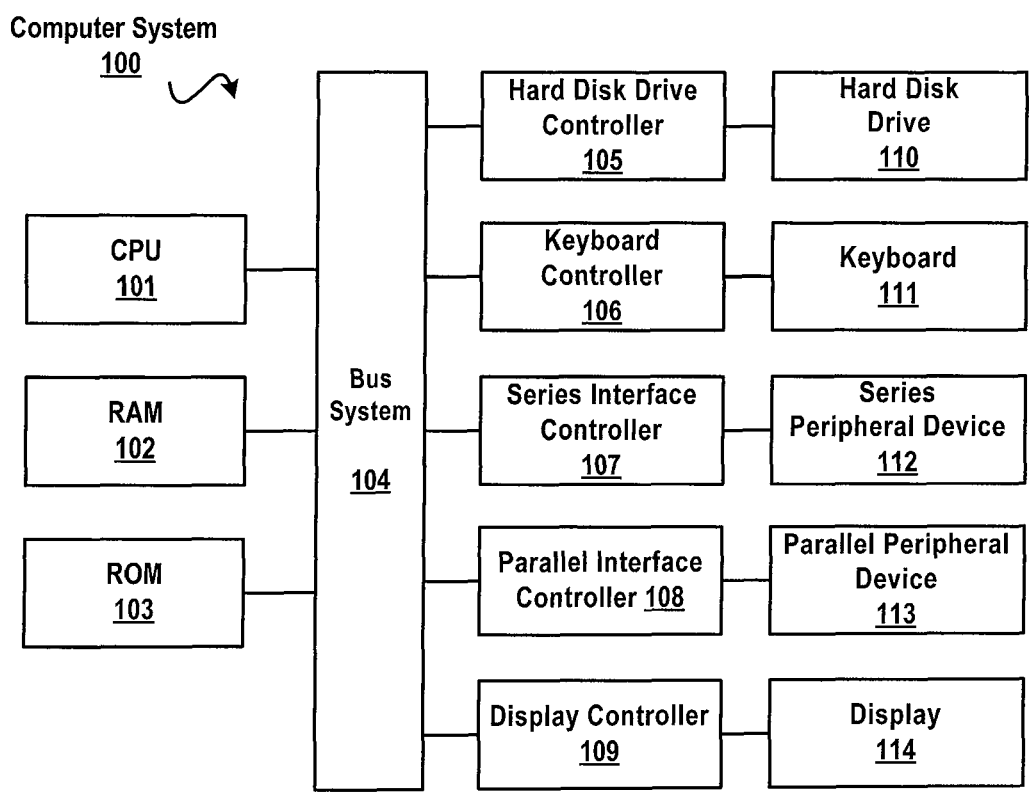
FIG. 1 schematically illustrates an exemplary computer system 100 which is applicable to implement the embodiments of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or one embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates an exemplary computer system 100 which is applicable to implement the embodiments of the present invention. As illustrated in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among the above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as illustrated in FIG. 1 is only for the exemplary purpose rather than any limitation to the present invention. In some cases, some devices may be added to or removed from the computer system 100 based on specific situations.

Figure 2:
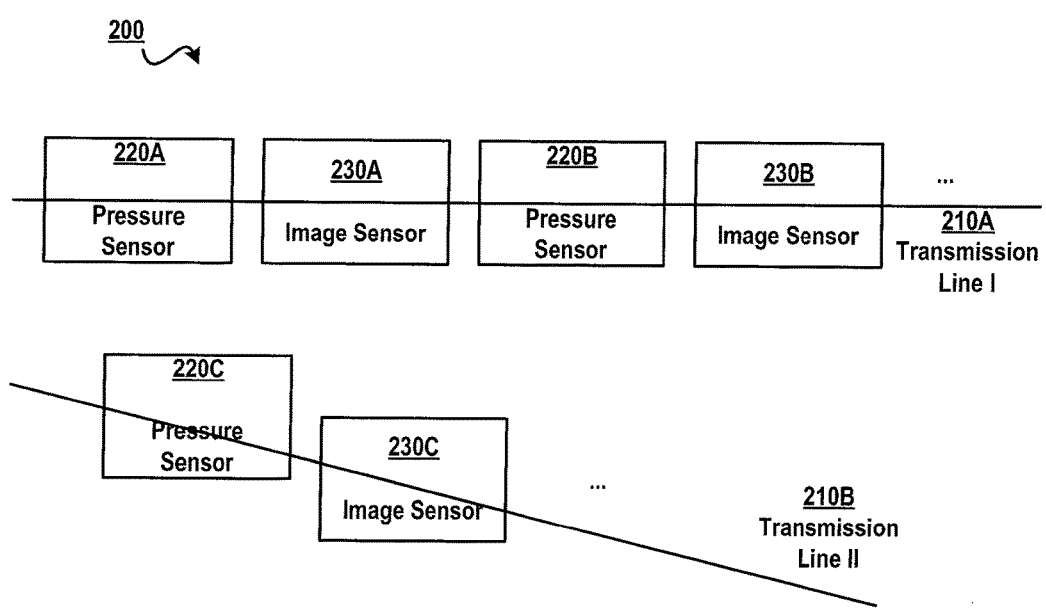
FIG. 2 schematically illustrates a schematic view of a method for monitoring ice coating status on transmission lines according to a solution.

FIG. 2 schematically illustrates a schematic view 200 of a method for monitoring ice coating status on transmission lines according to one solution. In FIG. 2 only transmission line I 210A and transmission line II 210B are illustrated schematically, whereas in real grids, there may be thousands of or even more transmission lines. In this solution, it is necessary to arrange on each transmission line sensors like pressure sensors 220A, 220B, 220C and image sensors 230A, 230B, 230C. However, in order to ensure the accuracy of monitoring results, it is necessary to deploy along each transmission line a large amount of sensors (for example, one pressure sensor and/or one image sensor are/is deployed every 2 km) which require a considerable cost of human and material resources for installation and maintenance.

Since transmission lines cover large scope, run a long distance and are hard to be monitored and maintained, in real applications it is almost impossible to deploy sensors on each transmission line for monitoring. A common practice is to monitor only key lines to ensure the security of backbone transmission lines. In view of the drawback of this solution, there is a serious need for a technical solution capable of inclusively learning possible ice coating situations on each transmission line, and it is desired that this technical solution can make use of existing resources as much as possible and that sensor devices do not need to be deployed on each transmission line.

Figure 3:
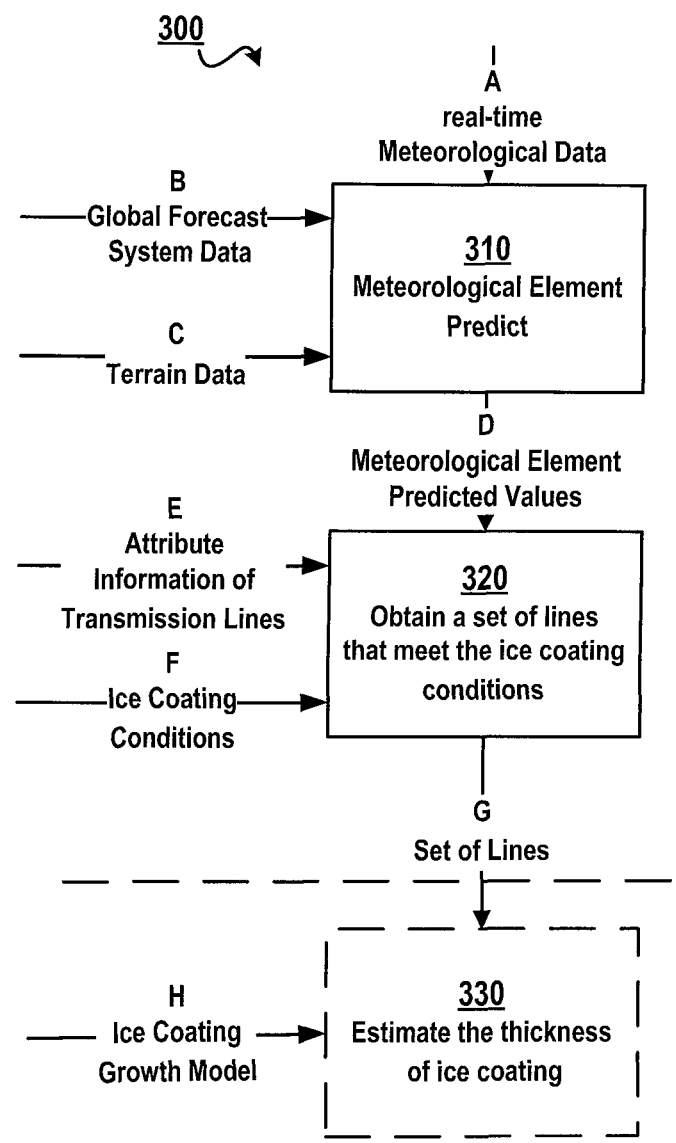
FIG. 3 schematically illustrates an architectural view of a solution according to one embodiment of the present invention.

FIG. 3 schematically illustrates an architectural view 300 of a solution according to one embodiment of the present invention. This embodiment eliminates the defect in the prior art of monitoring situations of transmission lines in real time by a large amount of sensors and proposes a method for predicting ice coating situations on transmission lines based on meteorological elements.

As illustrated in the view 300, in block 310 high-precision prediction of meteorological elements is performed based on real-time meteorological data (as illustrated by arrow A), Global Forecast System data (as illustrated by arrow B) and terrain data (as illustrated by arrow C). It should be noted that the high-precision prediction mentioned here refers to providing a prediction, whose precision is higher than ordinary weather forecast, along transmission lines. In the context of the present invention, meteorological elements may include temperature, humidity, atmospheric pressure, wind speed, and wind direction, which may be termed five meteorological elements for short. It should be noted that in the present invention only the five meteorological elements are used as examples of meteorological elements which might be involved in predicting ice coating status. However, these examples are not for limiting purposes, and those skilled in the art may introduce other meteorological elements based on special demands of an application environment.

Through the processing in block 310, a meteorological element predicted value (as illustrated by arrow D) of an area where the transmission line is located may be generated. Next, in block 320 the meteorological element predicted value of the area where the transmission line is located is read, and with reference to attribute information of the transmission line itself (as illustrated by arrow E, such as a line radius, etc.) and conditions for forming ice coating (as illustrated by arrow F, for example, meteorological elements such as temperature, humidity, atmospheric pressure, wind speed, and wind direction), a set of lines that meet the conditions for forming ice coating is obtained.

In blocks 310 and 320 as described above there is illustrated basic architecture for predicting ice coating status on transmission lines. Based on this architecture, it is possible to predict on which transmission lines ice coating might be formed for some time in the future, so as to assist transmission line maintenance personnel to formulate emergency measures and plan ahead. In another embodiments, for predicting ice coating status on transmission lines more accurately, block 330 below the dotted line in FIG. 3 further illustrates predicting the thickness of possible ice coating on the line based on an ice coating growth model (as illustrated by arrow H). Through the processing in block 330, more precise prediction data may be further provided for transmission line maintenance personnel to take emergency measures in view of the situations of the ice coating thickness on sections of the transmission line.

In this embodiment, the status of ice coating is predicted by taking into consideration the line attribute information and meteorological elements at the transmission line comprehensively. Compared with the method in the prior art in which only current conditions of a transmission line are monitored and then remedies are taken after the occurrence of an accident, the technical solution of the present invention can predict the status of ice coating likely to appear in the future (72 hours or even longer), and remind maintenance personnel of taking preventive measures in advance.

Figure 4:
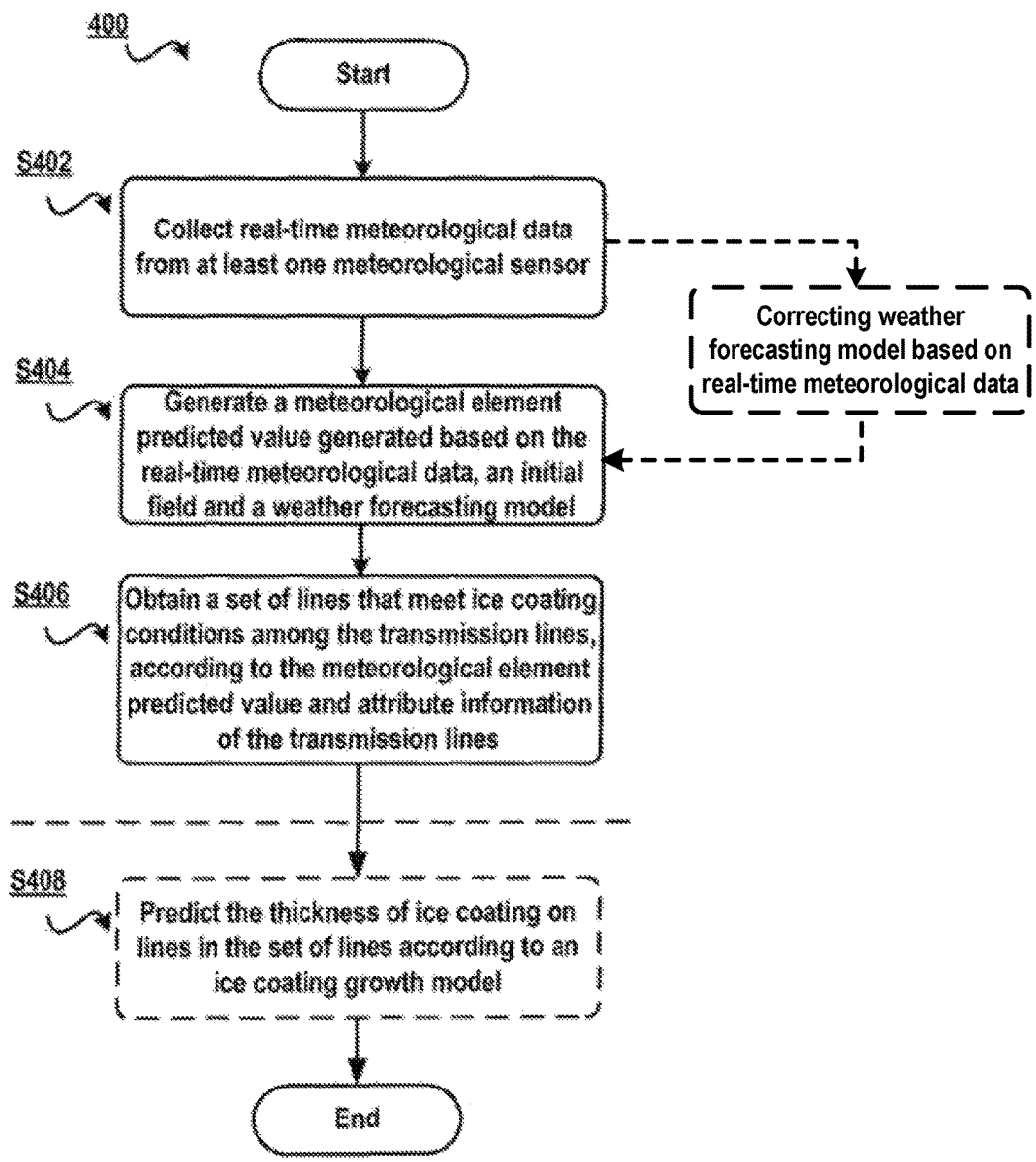
FIG. 4 schematically illustrates a flowchart of a method for predicting ice coating status on transmission lines according to one embodiment of the present invention.

With reference now to FIGS. 4-9, various embodiments of the present invention are presented in the detailed description. FIG. 4 schematically illustrates a flowchart 400 of a method for predicting ice coating status on transmission lines according to one embodiment of the present invention. In this embodiment there is provided a method for predicting ice coating status on transmission lines, including: collecting real-time meteorological data from at least one meteorological sensor S402; generating a meteorological element predicted value based on the real-time meteorological data, an initial field, and a weather forecasting model S404; and obtaining a set of lines that meet ice coating conditions among the transmission lines, based on the meteorological element predicted value and attribute information of the transmission lines S406.

First of all, in step S402 real-time meteorological data is collected from at least one meteorological sensor. It should be noted that in this embodiment the sensor is different from the pressure sensor and image sensor for directly monitoring current ice coating conditions in the existing technical solution as illustrated in FIG. 2, but is a meteorological sensor that collects meteorological data for predicting meteorological conditions, e.g., a sensor for measuring the five meteorological elements.

In this embodiment, although it is still necessary to deploy a sensor at the transmission lines for collecting meteorological data in real time, the meteorological sensor only needs to be deployed at limited locations capable of representing typical meteorological types. For example, in a mountain area meteorological sensors may be deployed at those transmission lines at mountaintops and in valleys; in a plain, meteorological sensors may also be deployed on transmission lines at limited locations, for collecting typical meteorological data in real time. In this manner, even if it is desired to predict the status of ice coating in the entire geographic area of Beijing, only ten or tens of meteorological sensors are needed.

Next, in step S404, a meteorological element predicted value is generated based on the real-time meteorological data, an initial field and a weather forecasting model. In this embodiment, the initial field refers to a description of atmospheric status at an initial status (t=0) moment in the weather forecasting model, and is a basis for generating a meteorological element predication value at the moment of t>0. In addition, the weather forecasting model is a data model that is available to the public for free or by payment, e.g., the Weather Research and Forecasting (WRF) model developed by the United States National Centers for Environmental Prediction (NCEP) and National Center for Atmospheric Research (UCAR). The Weather Research and Forecasting model is a widely applied forecasting model, and its application interface is open to the public. Those skilled in the art may use this model according to their needs.

In this embodiment, the generated meteorological element predicted value may be a meteorological element predicted value (e.g., including the above-mentioned five meteorological elements) at each grid point within a target area represented by a grid. In addition, according to demands, the target area may be divided by different resolutions, for example, the grid may be 5 km×5 km, 1 km×1 km or other value. Meteorological elements at different altitudes may further be represented, such as 100 m, 300 m from the ground. Hence, in this embodiment the meteorological element predicted value may accurately represent the five meteorological elements at specific locations (e.g., represented by three-dimensional coordinates (longitude, latitude, altitude)) on transmission lines.

In step S406, based on the meteorological element predicted value and attribute information of the transmission lines, a set of lines that meet ice coating conditions among the transmission lines is obtained. With the knowledge of meteorological element predicted values at various pole and tower points (e.g., with intervals less than 500 m) on transmission lines, it is possible to calculate which points meet conditions for forming ice coating, and then obtain a set of lines that meet ice coating conditions among transmission lines. It should be noted that ice coating conditions here may be meteorological conditions summarized based on historical experience and capable of forming ice coating on transmission lines and, for example, including constraints on temperature, humidity, etc.

It should be noted that because meteorological elements vary with time, the content in a set of lines that meets ice coating conditions will also vary constantly. For example, when temperature increases and humidity decreases, some lines that met ice coating conditions might no longer meet ice coating conditions, and ice coating at the surface of these lines will melt and even disappear; when temperature decreases and humidity increases, ice coating might be formed on some lines that did not meet ice coating conditions. Therefore, the procedure of obtaining a set of lines meeting ice coating conditions is a periodically repeated, unremitting procedure.

Based on the method in steps S402-S406, it is possible to predict on which transmission lines ice coating may be formed for some time in the future so that transmission line maintenance personnel can take corresponding precautions.

In another embodiment of the present invention, there is further comprised predicting the thickness of ice coating on lines in the set of lines according to an ice coating growth model. As illustrated by alternative step S408 below the dotted line in FIG. 4, it is possible to predict the thickness of ice coating on lines in the set of lines according to an ice coating growth model. Ice coating conditions are composed of two factors. One is locations of transmission lines on which ice coating might be formed; since on which transmission lines ice coating might be formed is obtained in step S406, locations where ice coating is formed are known at this point. The other is how the thickness of ice coating increases or disappears with the lapse of time at these locations; this requires an ice coating growth model for prediction. For example, at a specific time point t=t1, the thickness of ice coating is relevant to an initial state of ice coating at t=0, and further to meteorological element predicted values within the time period Δt=t1−0=t1.

In the embodiments of the present invention, high-precision meteorological element predicted values need to be generated. Numerical Weather Prediction (NWP) is a current popular approach, and provides prediction with higher temporal and spatial resolution than older approaches. Because high performance computers and parallel computing technology have developed and weather models, physical process parameterization and its algorithms have been continuously perfected, the spatial resolution of Numerical Weather Prediction has been improved from dozens of kilometers to 1 km or less. However, for a panhandle region along transmission lines, the 1 km resolution still cannot meet the requirement for predicting ice coating on transmission lines, so there is a need to further explore a more precise prediction approach.

The error of Numerical Weather Prediction mainly results from "model error" and "initial field error." The model error is mainly caused by inaccurate expression of atmospheric motions by the model itself; generally, the higher the model's resolution is, the higher the model's precision. However, since the driving procedure of different weather systems differs, corresponding physical process parameterization schemes are required for cooperation with model resolution. On the other hand, the initial field error refers to the error of description of atmospheric conditions at an initial state (t=0) moment in the prediction model. Hence, more observed data and dynamic equilibrium conditions are required for revising the initial model of the model, e.g., using an advanced data assimilation method.

In one embodiment of the present invention, there is further comprised correcting the weather forecasting model by using the real-time meteorological data. "Correction" here means using the real-time meteorological data collected from the at least one meteorological sensor to reduce or eliminate model error of the weather forecasting model.

The real-time meteorological data refer to measured values obtained from meteorological sensors at limited observed locations, which measured values are real measured values. By comparing real measured values with predicted values generated based on the weather forecasting model, model error of the weather forecasting model may be corrected so as to generate more accurate predicted values. In the weather forecasting field, now that the weather forecasting model has been configured successfully, those skilled may obtain meteorological element predicted values at different locations based on methods in the prior art, which is not detailed here.

In one embodiment of the present invention, a hybrid data assimilation method may be used for correction. Specifically, correcting the weather forecasting model by using the real-time meteorological data includes: under physical constraint conditions, solving a minimum value of difference between the initial field and the real-time meteorological data collected from the at least one meteorological sensor.

It should be noted that the real-time meteorological data refer to measured values collected from sensors deployed at discrete points, and the weather forecasting model predicts values of meteorological elements on continuous transmission lines. When correcting continuous values by using discrete values, physical constraint conditions should be considered, e.g., relationships of wind force with temperature and humidity. For example, the formula below may be used for calculation:

$$J(x) = \frac{1}{2}(x-x_b)^T B^{-1}(x-x_b) + \frac{1}{2}[H(x)-y]^T R^{-1}[H(x)-y] \quad \text{Formula (1)}$$

where J(x) denotes a target generic function, i.e., a target of minimization process under constraints, which represents the difference between an initial field and a measured value obtained from a meteorological sensor;

x denotes an initial field, which may be iteratively updated according to a value of J;

$x_b$ denotes an estimated value of the initial field, i.e., the start point of the last iteration;

y denotes a measured value obtained from a meteorological sensor, which is a discrete value;

B denotes a background field covariance matrix, representing a physical constraint; H and R respectively denote parameter matrixes related to variable conversion, for calculating an increment of the measured value with respect to x.

By the above-described method, error of the weather forecasting model itself may be reduced or eliminated.

In one embodiment of the present invention, the initial field is extracted from Global Forecast System data and terrain data associated with an area where the transmission line is located. It should be noted that the initial field refers to a description of atmospheric conditions at an initial state (t=0) moment in the weather prediction model, or it may be considered that the initial field is current atmospheric conditions of an area where the transmission line is located. The initial field may be extracted based on meteorological data of the Global Forecast System (GFS) and global terrain data. GFS is a Numerical Weather Prediction model published by the United States National Oceanic and Atmospheric Administration (NOAA), whose data format is open to the public. Hence, those skilled in the art may extract desired content from this model and form the initial field in conjunction with terrain data of an area where the transmission line is located. Terrain data is, for example, Digital Elevation Model (DEM) data.

It should be noted that the initial field formed by the above method may be directly used as an input of configuring the weather forecasting model. However, since atmospheric conditions of the initial field might be affected by various factors and inaccurate description of the initial field will compound error with the accumulation of time, more observed data and dynamic equilibrium conditions are required for revising the initial model of the model.

Another embodiment of the present invention further includes: assembling initial fields to form an ensemble forecasting initial field; and configuring the weather forecasting model by using the ensemble forecasting initial field. This step is intended to reduce or eliminate the initial field error by using an ensemble forecasting method. The ensemble forecasting initial field is obtained by adding perturbation information to the initial field and calculating the impact of the perturbation information on the initial field. For example, perturbation information may be present in temperature, humidity, atmospheric pressure, wind direction, etc., so various perturbation information may be added to the initial field in one or more rounds respectively and then an, optimized ensemble forecasting initial field is calculated. A calculation result in a previous round may be called an ensemble forecasting member.

In one embodiment of the present invention, the assembling initial fields to form an ensemble forecasting initial field includes: in each of a plurality of rounds, adding at least one perturbation factor to initial fields to form an ensemble forecasting member; and forming the ensemble forecasting initial field based on the ensemble forecasting member in each round.

Specifically, a formula below may be used to assemble impacts of various perturbation information and obtain the ensemble forecasting initial field:

$$X^a = X^f + P_e H^T [H P_e H^T + R]^{-1} [D - H X^f] \quad \text{Formula (2)}$$

$$P_e = \frac{X'^f X'^{fT}}{n-1}$$

Where $X'^f = X^f - \overline{X}^f$, and $X^a$ denotes an optimized ensemble forecasting initial field (including the five meteorological elements);

$X^f$ denotes an original perturbation of the ensemble forecasting initial field;

$X'^f$ denotes a perturbation portion of the ensemble forecasting initial field;

$P_e$ denotes a background field covariance matrix, which is calculated by the perturbation portion and used for evaluating a physical constraint correction item of the current background field; when used in conjunction with hybrid data assimilation, $P_e$ is used for providing hybrid data assimilation with physical constraints from the ensemble forecasting initial field;

H and R respectively denote parameter matrixes related to variable conversion, for calculating an optimized correction increment;

n denotes the number of ensemble forecasting members, e.g., 20.

It should be noted that the principle of formula (2) is to add various perturbation factors to the initial field to output a plurality of ensemble forecasting members. Since atmospheric conditions represented by each ensemble forecasting member is slightly different, the uncertainty in the initial field can be simulated more accurately, and further the initial field error can be reduced or eliminated. The meaning of formula (2) is:

$X^a = X^f$ + physical constraints

Although formula (2) presents only one exemplary formula of physical constraints, those skilled in the art may design other calculation formula according to concrete demands.

Figure 5:
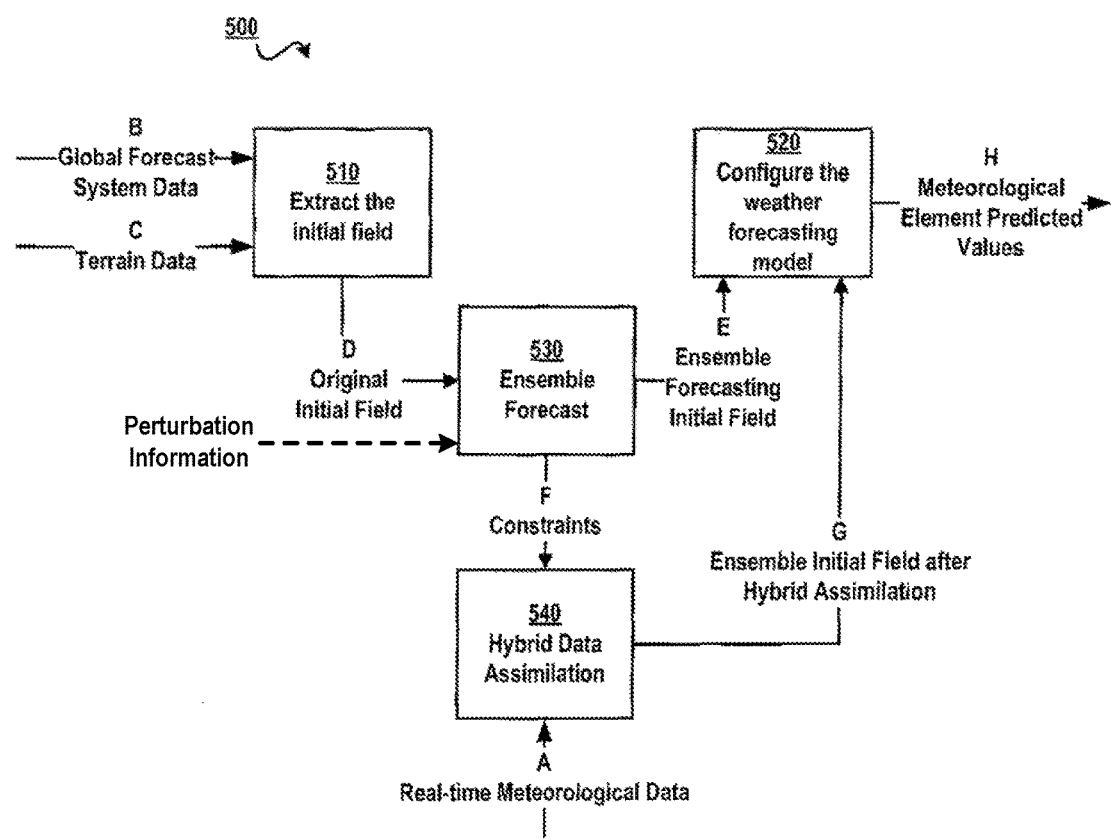
FIG. 5 schematically illustrates a schematic view of generating a meteorological element predicted value according to one embodiment of the present invention.

Further, the above hybrid data assimilation and ensemble forecasting may be used in conjunction, so as to further reduce or eliminate the initial field error while reducing or eliminating the model error, and comprehensively improve the prediction precision. FIG. 5 schematically illustrates a schematic view 500 of generating a meteorological element predicted value according to one embodiment of the present invention, which illustrates an exemplary embodiment of using hybrid data assimilation in conjunction with ensemble forecasting. FIG. 5 illustrates further details of block 310 in FIG. 3.

In block 510, the initial field is extracted by reading Global Forecast System data (as illustrated by arrow B) and terrain data (as illustrated by arrow C), at which point the extracted initial field is an original initial field without ensemble forecasting processing. As an input of ensemble forecasting, the original initial field is inputted (as illustrated by arrow D) to block 530. In block 530, moreover, the ensemble forecasting initial field is obtained by adding perturbation information to the original initial field. When using ensemble forecasting separately, the ensemble forecasting initial field (as illustrated by arrow E) may be inputted to block 520 for configuring the weather forecasting model.

When using ensemble forecasting in conjunction with hybrid data assimilation, constraints (as illustrated by arrow F) from ensemble forecasting are inputted to block 540 as an input of hybrid data assimilation processing. At this point, background field covariance matrix B, as illustrated in formula (1), is changed to $B = \alpha_1 B_1 + \alpha_2 B_2$, $\alpha_1 = 1 - \alpha_2$, where B denotes the background field covariance matrix, representing physical constraints. The physical constraints partially come from basic formula constraint $B_1$ and partially comes from current constraint $B_2$ of ensemble forecasting.

Through the above-described hybrid data assimilation processing in block 540, the generated ensemble initial field (as illustrated by arrow G) is used for configuring the weather forecasting model, thereby generating the meteorological element predicted value (as illustrated by arrow H).

It should be noted that the generated meteorological element predicted value may have different precisions; the precision mentioned here is an edge length of the grid into which a certain area is divided. For example, the meteorological element predicted value may be outputted at a precision of 2 km×2 km. Due to the special nature of transmission lines, special requirements are imposed on meteorological element forecasting at transmission lines. First of all, forecasting should be performed along a panhandle region of transmission lines, and altitudes of transmission lines at different locations are different. Besides, the interval between power towers/poles is usually less than 500 m, while the interval in a mountain area and other area with complex terrain is usually between 200 m and 300 m, so high-precision meteorological element predicted values should be provided.

Unlike traditional weather forecasting, ice coating prediction requires evaluating the meteorological risk on a whole line, which requires estimating the danger at any point of the line. Therefore, there is a need for a model grid resolution that is at least higher than 1 km. However, if a whole transmission line is covered by a 1 km×1 km grid, the calculation amount is amazingly large.

Based on special demands for predicting ice coating status on transmission lines, the present invention proposes a line-following nested grid technology, which provides a higher grid resolution near a line while providing a lower grid resolution at a location distant from the line. For a meteorological element predicted value, the precision along a transmission line is higher while the precision at a location distant from the transmission line is lower. This method can reduce the calculation complexity and ensure that a prediction result with enough precision can be obtained on transmission lines. In one embodiment of the present invention, generating a meteorological element predicted value based on the real-time meteorological data, an initial field and a weather forecasting model further includes: generating a meteorological element predicted value along the transmission line based on property information of the transmission line.

Here, the property information of the transmission line may comprise a topological structure, which refers to the trend, length, height and other information of the transmission line and may be represented, for example, using three-dimensional coordinates (longitude, latitude, altitude) of a starting point and ending point of each transmission line.

Figure 6A:
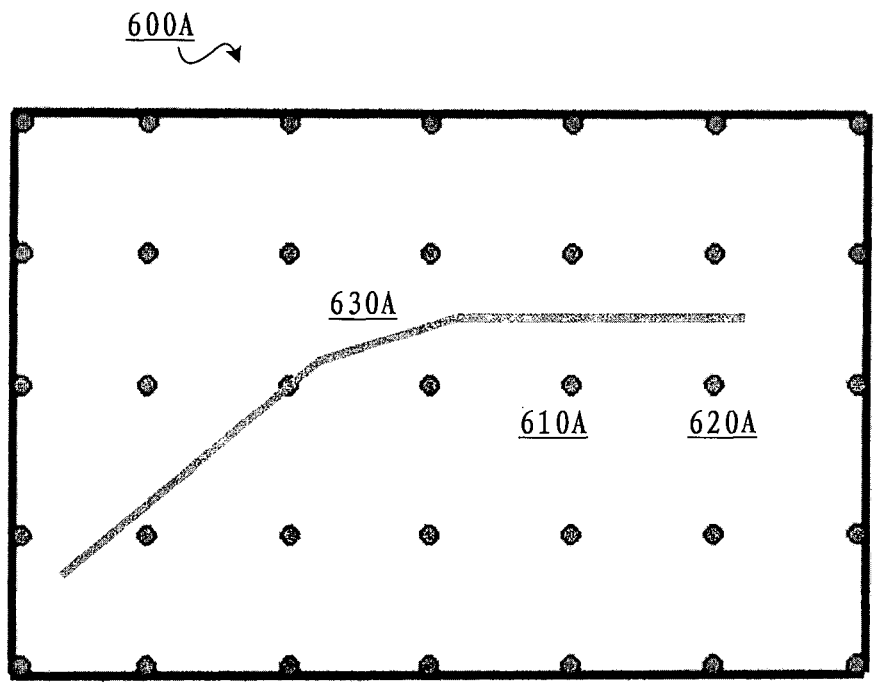
FIGS. 6A and 6B schematically illustrate a schematic view of generating meteorological element predicted values along transmission lines according to one embodiment of the present invention, respectively.
Figure 6B:
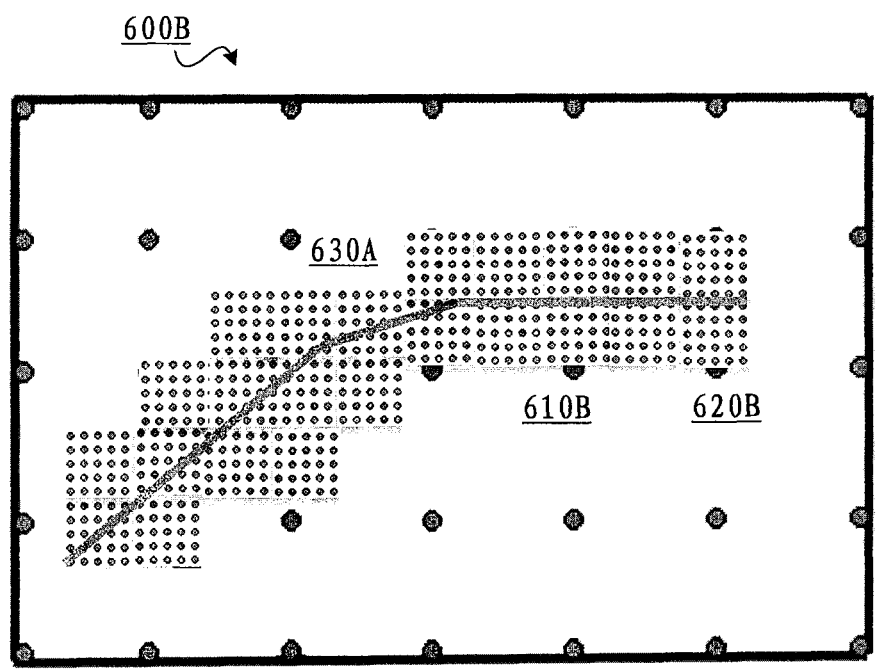

FIGS. 6A and 6B illustrate a schematic view of generating a meteorological element predicted value along a transmission line according to one embodiment of the present invention respectively. For example, a grid resolution in FIG. 6A is 3 km×3 km, i.e., a distance between points 610A and 620A in FIG. 6A is 3 km; transmission line 630A across the area illustrated in FIG. 6A. It should be noted that the meteorological element predicted value with the 3 km×3 km precision cannot meet the requirements for ice coating prediction, so a higher precision resolution (e.g., 0.3 km×0.3 km) is required. By reading the topological structure of the transmission line, coordinates of each point of the line may be obtained. Hence, a forecasting precision near the transmission line may be improved. For example, the grid along the transmission line (e.g., within an area of 10 km$^2$) in FIG. 6A may be subdivided into 10×10 higher-resolution grids (each with an area of 0.3 km×0.3 km), and a high-precision meteorological element predicted value at each grid is generated. By this method, the precision of meteorological element predicted values along transmission lines may be improved on the one hand, and on the other hand the amount of calculating meteorological elements of the whole area may be controlled.

Figure 7:
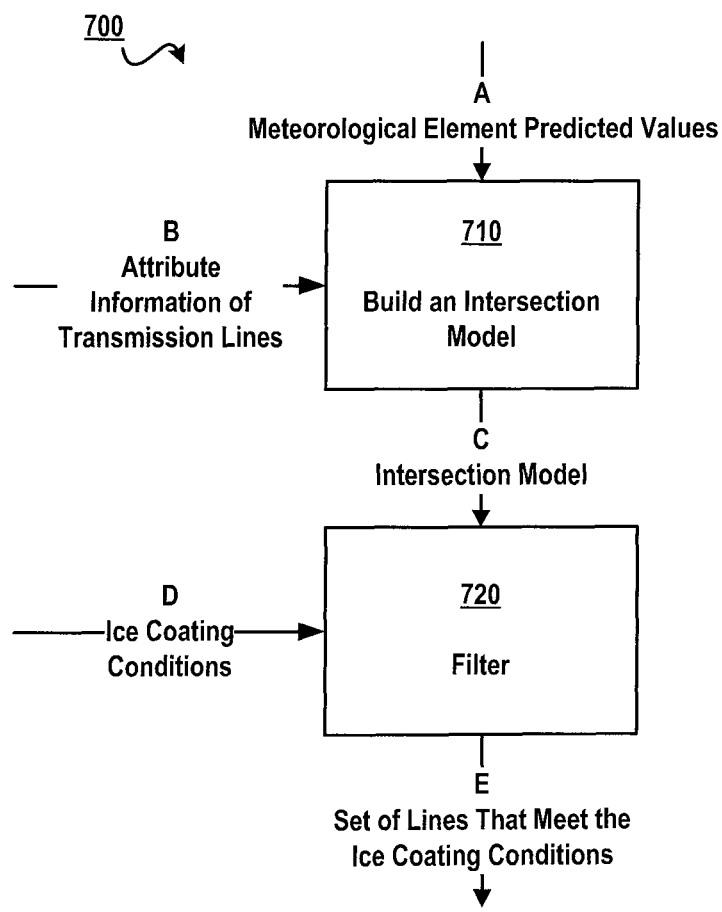
FIG. 7 schematically illustrates a schematic view of a set of lines that meet ice coating conditions according to one embodiment of the present invention.

In one embodiment of the present invention, obtaining a set of lines that meet ice coating conditions among the transmission lines based on the meteorological element predicted value and attribute information of the transmission lines includes: building an intersection module according to the meteorological element predicted values and the attribute information of the transmission line; and filtering the intersection module based on the ice coating conditions, so as to obtain a set of lines that meet the ice coating conditions among the transmission lines. With reference now to FIG. 7, a detailed description is presented to this embodiment.

FIG. 7 illustrates a schematic view 700 of calculating a set of lines that meet ice coating conditions according to one embodiment of the present invention, the schematic view 700 illustrating further details of block 320 in FIG. 3. First of all, in block 710 the meteorological element predicted value (as illustrated by arrow A) and attribute information of the transmission lines (as illustrated by arrow B) are read for building an intersection model. The intersection model comprises line topological information and meteorological element predicted values along transmission lines, which may be saved using a data structure defined by those skilled in the art themselves. For example, the structure below may be used:

```
Intersection Model
{location;              //e.g., represented by (longitude, latitude, altitude)
trend of line;          //e.g., represented by vector angle
temperature;            // e.g., represented by°C
humidity;               //e.g., represented by %
atmospheric pressure;   //e.g., represented by Pa
wind speed;             //e.g., including wind force (m/s) and wind direction
(vector angle)
...
}
```

In block 720, the generated intersection model (as illustrated by arrow C) is filtered using conditions for forming ice coating (as illustrated by arrow D), whereby a set of lines that meet ice coating conditions among the transmission lines is obtained (as illustrated by arrow E). It should be noted that here conditions for forming ice coating may be meteorological conditions summarized based on historical experience and capable of forming ice coating on transmission lines. For example, table 1 below illustrates an example of ice coating conditions:

TABLE 1

Ice Coating Conditions

| Number | Meteorological Element | Condition |
|---|---|---|
| 1 | temperature | <2° C. |
| 2 | humidity | more than 88% |
| 3 | wind speed | 0-7.5 m/s |
| 4 | wind direction | an angle with the normal direction of the transmission line is less than 50° |
| ... | ... | ... |

In one embodiment, the ice coating growth model is a hydrodynamic model associated with attribute information of transmission lines in the set of lines and meteorological element predicted values at transmission lines in the set of lines. Here, attribute information may include power configurations associated with transmission lines themselves, e.g., a radius of lines, voltage class of transmission lines (e.g., 300 kV), material of transmission lines, etc.

A variety of ice coating growth models has been devised, such as the Goodwin model, Chaine model, Makkonen model, etc. Those skilled in the art may predict the thickness of ice coating on lines where ice coating might be formed, based on these ice coating growth models or other ice coating growth models designed.

Figure 8:
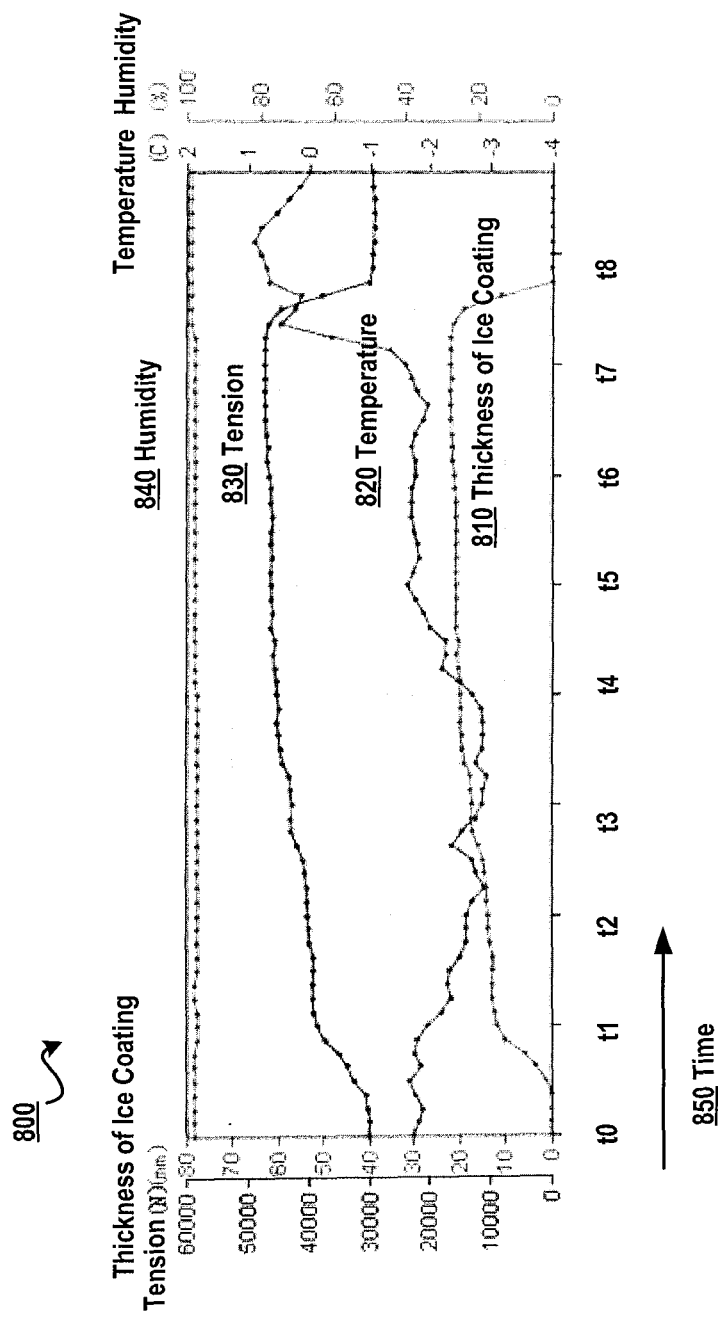
FIG. 8 schematically illustrates a prediction curve representing the thickness of ice coating on a line in the set of lines according to one embodiment of the present invention.

FIG. 8 schematically illustrates a prediction curve 800 representing the thickness of ice coating on a line in the set of lines according to one embodiment of the present invention. FIG. 8 illustrates relationships among humidity, tension, temperature and ice coating thickness, wherein a horizontal axis 850 represents time, two vertical axes on the left represent tension and ice coating thickness respectively, and two vertical axes on the right represent humidity and temperature respectively.

Take the time point "t7" in the horizontal coordinate as an example. At this point, the four curves from the bottom up represents: ice coating thickness 810, temperature 820, tension 830 and humidity 840, respectively. As seen from FIG. 8, when temperature rises, ice coating thickness decreases and tension on the transmission line decreases as well. It should be noted that ice coating thickness on the transmission line is further associated with a location of the line. FIG. 8 only illustrates predicted values of ice coating thickness at one location. However, those skilled in the art may appreciate that a prediction curve of the thickness of ice coating at another location of a transmission line may be represented in a similar way.

In one embodiment of the present invention, the meteorological sensor includes at least one of a temperature sensor, a humidity sensor, an atmospheric pressure sensor and a wind speed sensor. In order to generate meteorological element predicted values more accurately, those skilled in the art may further use other types of sensors for collecting corresponding meteorological elements.

Figure 9:
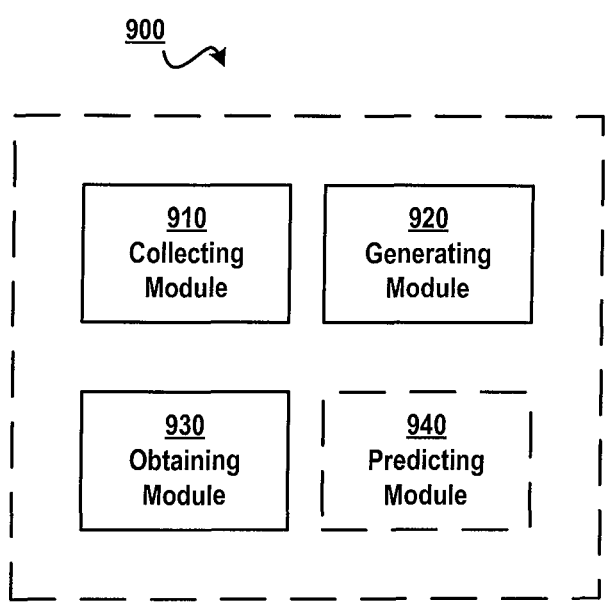
FIG. 9 schematically illustrates a schematic view of an apparatus for predicting ice coating status on transmission lines according to one embodiment of the present invention.

FIG. 9 illustrates a schematic view of an apparatus for predicting ice coating status on transmission lines according to one embodiment of the present invention. In this embodiment, an apparatus for predicting ice coating status on transmission lines comprises: a collecting module 910 configured to collect real-time meteorological data from at least one meteorological sensor; a generating module 920 configured to generate a meteorological element predicted value based on the real-time meteorological data, an initial field and a weather forecasting model; and an obtaining module 930 configured to obtain a set of lines that meet ice coating conditions among the transmission lines, based on the meteorological element predicted value and attribute information of the transmission lines.

Another embodiment of the present invention further comprises: a predicting module 940 configured to predict the thickness of ice coating on a line in the set of lines according to an ice coating growth model.

In one embodiment of the present invention, the ice coating growth model is a hydrodynamic model associated with attribute information of transmission lines in the set of lines and meteorological element predicted values at transmission lines in the set of lines.

In one embodiment of the present invention, the generating module 920 includes: a correcting module configured to correct the weather forecasting model by using the real-time meteorological data.

In one embodiment of the present invention, the correcting module includes: a minimizing module configured to solve a minimum value of difference between the initial field and the real-time meteorological data collected from the at least one meteorological sensor under physical constraints.

In one embodiment of the present invention, the initial field is extracted from Global Forecast System data and terrain data associated with an area where the transmission line is located.

In one embodiment of the present invention, the generating module 920 further includes: an assembling module configured to assemble the initial fields to form an ensemble forecasting initial field; and a configuring module configured to configure the weather forecasting model by using the ensemble forecasting initial field.

In one embodiment of the present invention, the assembling module includes: a perturbation module configured to, in each of a plurality of rounds, add at least one perturbation factor to the initial field to form an ensemble forecasting member; and a forming module configured to form the ensemble forecasting initial field based on the ensemble forecasting member for each round.

In one embodiment of the present invention, the generating module 920 further includes: a predicted value generating module configured to generate meteorological element predicted values along the transmission line based on the attribute information of the transmission line.

In one embodiment of the present invention, the obtaining module 930 includes: a building module configured to build an intersection module according to the meteorological element predicted values and the attribute information of the transmission line; and a filtering module configured to filter the intersection module based on the ice coating conditions, so as to obtain a set of lines that meet the ice coating conditions among the transmission lines.

In one embodiment of the present invention, the meteorological sensor includes at least one of a temperature sensor, a humidity sensor, an atmospheric pressure sensor and a wind speed sensor.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for predicting ice coating status on transmission lines, comprising:
    collecting real-time meteorological data from a plurality of meteorological sensors located near transmission lines at a geographic location;
    correcting a weather forecasting model to improve geographical resolution of the weather forecasting model by using at least a portion of the real-time meteorological data to solve a minimum value of difference between a first initial field of the weather forecasting model and the at least a portion of the real-time meteorological data to create a corrected initial field of the weather forecasting model, the first initial field indicating an atmospheric status at an initial state in the weather forecasting model, the minimum value being the result of subtracting the first initial field of the weather forecasting model and the at least portion of the real-time meteorological data, the solving of the minimum value of difference between the first initial field of the weather forecasting model and the at least the portion of the real-time meteorological data comprises calculating:

$$J(x) = \frac{1}{2}(x-x_b)^T B^{-1}(x-x_b) + \frac{1}{2}(H(x)-y)^T R^{-1}(H(x)-y)$$

where:
    J(x) denotes a target of minimization process under constraints, which represents a difference between the first initial field and values obtained from at least a portion of the real-time meteorological data,
    x denotes the first initial field, which may be iteratively updated according to a value of J,
    $x_b$ denotes an estimated value of the first initial field,
    y denotes a measured value obtained from at least one meteorological sensor of the plurality of meteorological sensors, which is a discrete value,
    B denotes a background field covariance matrix, representing a physical constraint, and
    H and R respectively denote parameter matrixes related to variable conversion, for calculating an increment of the measured value with respect to x;
    generating meteorological element predicted values based on the real-time meteorological data, the corrected initial field and the weather forecasting model, the meteorological element predicted values predicting ice coating conditions at specific locations of the transmission lines in the geographic location;
    identifying locations of at least portions of the transmission lines that meet ice coating conditions among the transmission lines, based on the meteorological element predicted values and attribute information of the transmission lines, the attribute information of the at least portions of the transmission lines indicating physical or electrical attributes of the transmission lines; and
    adjusting maintenance plans to address ice coating on the identified locations of at least portions of the transmission lines, thereby reducing a number of the meteorological sensors arranged along the transmission lines.

2. The method according to claim 1, wherein the weather forecasting model is a Weather Research and Forecasting (WRF) model developed by United States National Centers for Environment Prediction (NCEP) and National Center for Atmospheric Research (UCAR).

3. The method according to claim 1, wherein the identifying the locations of at least portions of the transmission lines that meet ice coating conditions among the transmission lines, based on the meteorological element predicted values and attribute information of the transmission lines comprises:
    building an intersection module according to one or more of the meteorological element predicted values and the attribute information of the transmission line; and
    filtering the intersection module based on the ice coating conditions, so as to identify the locations of at least portions of the transmission lines that meet the ice coating conditions among the transmission lines.

4. An information processing system for predicting ice coating status on transmission lines, the information processing system comprising:

a memory;

a processor configured to execute instructions stored in the memory, the instructions when executed, cause the steps of a method comprising:

collecting real-time meteorological data from a plurality of meteorological sensors located near transmission lines at a geographic location;

correcting a weather forecasting model to improve geographical resolution of the weather forecasting model by using at least a portion of the real-time meteorological data to solve a minimum value of difference between a first initial field of the weather forecasting model and the at least a portion of the real-time meteorological data to create a corrected initial field of the weather forecasting model, the first initial field indicating an atmospheric status at an initial state in the weather forecasting model, the minimum value being the result of subtracting the first initial field of the weather forecasting model and the at least portion of the real-time meteorological data, the solving of the minimum value of difference between the first initial field of the weather forecasting model and the at least a portion of the real-time meteorological data comprises calculating $$J(x) = \frac{1}{2}(x - x_b)^T B^{-1}(x - x_b) + \frac{1}{2}(H(x) - y)^T R^{-1}(H(x) - y)$$

where:

J(x) denotes a target of minimization process under constraints, which represents a difference between the first initial field and values obtained from at least a portion of the real-time meteorological data, x denotes the first initial field, which may be iteratively updated according to a value of J, $x_b$ denotes an estimated value of the first initial field, y denotes a measured value obtained from at least one meteorological sensor of the plurality of meteorological sensors, which is a discrete value, B denotes a background field covariance matrix, representing a physical constraint, and H and R respectively denote parameter matrixes related to variable conversion, for calculating an increment of the measured value with respect to x;

generating meteorological element predicted values based on the real-time meteorological data, the corrected initial field and the weather forecasting model, the meteorological element predicted values predicting ice coating conditions at specific locations in the geographic location;

identifying locations of at least portions of the transmission lines that meet ice coating conditions among the transmission lines, based on the meteorological element predicted values and attribute information of the transmission lines, the attribute information of the at least portions of the transmission lines indicating physical or electrical attributes of the transmission lines; and adjusting maintenance plans to address ice coating on the identified locations of at least portions of the transmission lines, thereby reducing a number of the meteorological sensors arranged along the transmission lines.

5. The information processing system according to claim 4, wherein the weather forecasting model is a Weather Research and Forecasting (WRF) model developed by United States National Centers for Environment Prediction (NCEP) and National Center for Atmospheric Research (UCAR).

6. The information processing system according to claim 4, wherein the identifying the locations of at least portions of the transmission lines that meet ice coating conditions among the transmission lines, based on the meteorological element predicted values and attribute information of the transmission lines comprises:

building an intersection module according to one or more of the meteorological element predicted values and the attribute information of the transmission line; and filtering the intersection module based on the ice coating conditions, so as to identify the locations of at least portions of the transmission lines that meet the ice coating conditions among the transmission lines.

7. The information processing system according to claim 4, wherein the first initial field is based on meteorological data of a Global Forecast System (GFS) and terrain data associated with the geographical location.

8. The information processing system according to claim 7, wherein the terrain data is Digital Elevation Model (DEM) data.

9. The information processing system according to claim 4, wherein the method further comprises adding perturbation information based on perturbation conditions in the geographic area to the first initial field before correcting the weather forecasting model.

* * * * *